Figure 1:
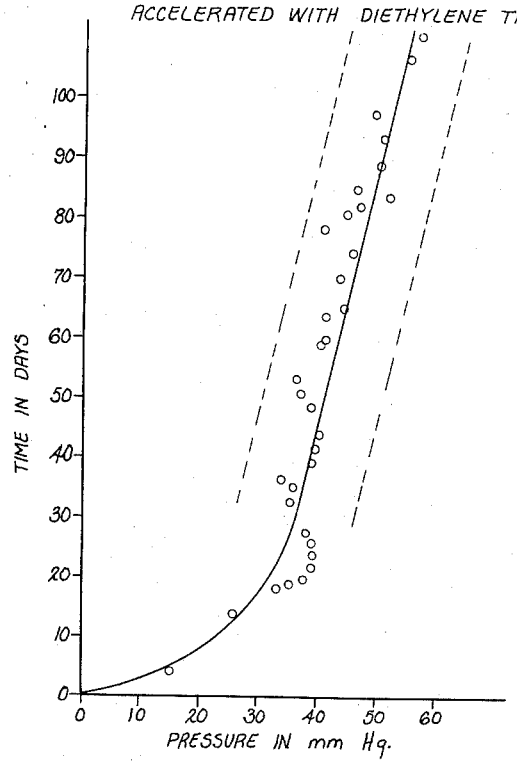

Jan. 17, 1961 W. J. LANTZ 2,968,571
LOW GASSING ZINC DUST PAINT
Filed Aug. 13, 1959

INVENTOR
Willard J. Lantz
BY
ATTORNEYS

2,968,571

LOW GASSING ZINC DUST PAINT

Willard J. Lantz, Nixon, N.J., assignor to American Smelting and Refining Company, New York, N.Y., a corporation of New Jersey Filed Aug. 13, 1959, Ser. No. 833,640

10 Claims. (Cl. 106—14)

This invention relates in general to zinc dust paints and more particularly to an improved zinc dust paint having relatively low gassing properties.

Zinc dust paints are commonly of four types, (1) paints containing zinc dust extended with other pigments such as zinc oxide, (2) zinc-rich paints containing up to 93 to 95 percent by weight of zinc in the dry organic film, (3) the heat resistant zinc dust paints and (4) the inorganic silicate type vehicle paints. The heat resistant type paints are the petroleum resin paints, butyl titanate and silicone resin paints. The inorganic silicate vehicle paints are sodium silicate containing zinc dust paints. The zinc-rich paint vehicles are generally those which dry from solvent evaporation, such as chlorinated rubber, polystyrene, polyvinyl chloride-acetate copolymers and the like.

In the extended or conventional zinc dust paints, linseed oil and oleoresinous vehicles are customarily employed. The extender pigment is preferably zinc oxide and other pigments may be employed to achieve any desired color in the paint. Customarily the ratio of zinc dust to the zinc oxide extender is maintained at approximately four to one and the total pigment content of the dry film may be about 80 percent by weight.

Gas evolution from such formulations in packaged storage containers has been the greatest problem with zinc paints and has resulted in a poor market because of storage and packaging problems. Many manufacturers use rubber gaskets to allow for inevitable gas leakage while others provide two-compartment containers wherein the zinc dust is separately packaged. It has been suggested that the presence of moisture is the primary cause of gas evolution on prolonged storage of zinc paints together with a secondary possibility of gas formation on direct reaction between the zinc and the free fatty acid or acid content of the paint vehicle. These reactions may take the following course with accompanying evolution of hydrogen and development of excessive pressure in the container:

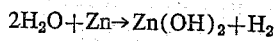

and

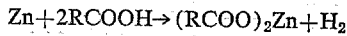

Heretofore attempts made at inhibiting gas evolution in zinc containing paints involved the use of hygroscopic materials, particularly calcium oxide, silca gel and the like, the purpose of which is to absorb or chemically immobilize the moisture which is either present in the paints initially or formed in the above described manner. None of these materials have proved satisfactory. The silica gel, while effective to a degree, causes an objectionable increase in the viscosity of the paint.

It has been found that gas evolution in paint compositions may be effectively controlled by the incorporation of an additive comprising tetraethyl orthosilicate into the zinc paint formulation. It has also been found that the effectiveness of the additive may be significantly increased if the acid number of the vehicle is maintained at a low value but above complete neutrality. Accordingly, it is found that gas evolution is reduced to an absolute minimum by incorporation of tetraethyl orthosilicate as an additive to the vehicle together with a sufficient amount of diethylene triamine or other basic material to approximately that required, or preferably slightly less than that required, to neutralize the acid content of the paint vehicle. Where the vehicle is a glyceride drying oil, it is found that the addition of diethylene triamine in amount just less than that theoretically required to neutralize the free fatty acid in the oil remarkably accelerates the reaction of the tetraethyl orthosilicate with the moisture in the vehicle. The reaction of the tetraethyl orthosilicate with the aqueous content of the zinc paint results in the formation of ethanol and silica in accordance with the following reaction:

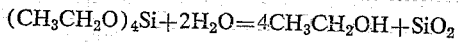

The reaction occurs only under controlled conditions. In accordance with the present invention, it has been found that optimum results are obtained by adding the active reagent to the paint drying oil approximately twenty-four hours prior to paint manufacture. The amount of the tetraethyl orthosilicate may vary widely, and even minute amounts tend to retard the gassing tendency. In many instances successful results are achieved by the addition of from 4 to 6 percent, preferably around 5 percent, of the tetraethyl orthosilicate based upon the weight of the drying oil. It is observed that the zinc oxide extender originally contains the greatest quantity of moisture although the moisture inherently contained in the linseed oil is the more reactive.

PREPARATION OF PAINT

A conventional type zinc dust paint is prepared by ball milling zinc oxide and the treated oil or oleoresinous vehicle in the approximate ratio of 1:1 for approximately twenty-four hours to produce the paint base. After this period, the remaining oil thinners and driers are incorporated along with the zinc dust pigment. The resulting formulation has approximately the following composition:

62.4 parts zinc dust
    15.6 parts zinc oxide
    20.6 parts treated raw linseed oil
    1.4 parts thinners and driers The driers used in the formulation consist of approximately 0.25 percent lead, 0.028 percent manganese, and 0.014 percent cobalt based upon the weight of the oil.

In this formulation and in succeeding formulations a neutralizer such as diethylene triamine is preferably added in an amount not quite theoretically sufficient to neutralize the free acid content in the oil.

GAS TESTS ON ZINC DUST/ZINC OXIDE PAINTS

The antigassing effect of tetraethyl orthosilicate was determined by two methods (1) the can test method and (2) the straight tube manometer method. The can test consists of placing two ounces of the test sample of paint in a 2⅔ ounce can sealed with epoxy cement. The test cans are placed in a clamping frame in an oven at 125° F. and allowed to remain for a given period of time. On removal, the cans are allowed to come to room temperature and are tested by puncturing with a dial-type gage. The pressure is recorded in pounds per square inch. The antigassing effect of tetraethyl orthosilicate was compared with the antigassing effect of triisopropyl borate and aluminum isopropylate materials which should react in a similar manner.

A second test method using a straight tube manometer was employed wherein about 100 milliliters of the test paint is poured into a glass tube. The tube is placed in a water bath at 125° F. and the straight tube manometer is inserted and fastened. After the paint has reached the bath temperature, the system is then sealed and the pressure developed by the paint is read in millimeters of mercury corrected for barometric variations.

The results of these tests are set forth in the following tables:

Table I

| Additive | Amount | How Added | Pressure (mm. of Hg) | Duration of Test in Days | Remarks |
|---|---|---|---|---|---|
| Triisopropyl borate | 0.49% | to paint | 170 | 33 | |
| Do | 0.75% | do | 132 | 33 | |
| Do | 0.99% | do | 112 | 33 | |
| Do | 1.23% | do | 92 | 33 | |
| Tetraethyl orthosilicate | 0.93% | 5% on oil | 57, 67 | 53 | |
| Do | 1.25% | to paint | 42 | 52 | |
| Do | 1.50% | do | 26 | 52 | |
| Aluminum isopropylate | 0.25% on dust | with zinc dust | 269, 253 | 66 | Additive caused paint to gel. |
| Do | do | as solution with zinc dust | 350, 330 | 7 | |
| Do | 0.5% on dust | with dust | 23, 35 | 95 | |

As shown by these results the tetraethyl orthosilicate was remarkably superior in antigassing effect on zinc paint to the prior known additives.

In a further series of accelerated aging tests at 125° F. the antigassing effect of tetraethyl orthosilicate (TEOS) alone and in the presence of lime (CaO) and diethylene triamine (DTA) was measured with the following results:

Table II

| Additive | Amount | How Added | Pressure (mm. of Hg.) | Duration of Test in Days |
|---|---|---|---|---|
| None [1] | | | 430 | 3 |
| CaO | 0.5% on dust | with zinc dust | 42, 40 | 11 |
| CaO | do | do | 234, 203 | 20 |
| DTA | 0.13% on paint base | to paint base | 103 | 9 |
| CaO / TEOS | 0.05% on dust / 1.25% | dust paint | 29 | 32 |
| CaO / TEOS | 0.075% on dust / 1.25% | do | 23 | 32 |
| CaO / TEOS | 0.1% on dust / 1.25% | do | 20 | 32 |
| CaO / TEOS | 0.2% on dust / 1.25% | do | 15 | 32 |
| DTA / TEOS | 0.1% on oil / 1.25% | to paint | 21 | 17 |
| DTA / TEOS | 0.2% on oil / 1.25% | do | 11 | 17 |
| DTA / TEOS | 0.3% on oil / 1.25% | do | 0 | 17 |
| DTA / TEOS | 0.4% on oil / 1.25% | do | 4 | 17 |
| TEOS | 1.75% | do | 13, 17 | 55 |
| TEOS | 1.75% CaO to neutralize acid | paint and dust | 25, 25 | 55 |
| CaO / TEOS / DTA | 1.75% DTA to neutralize acid | paint | 6, 6 | 55 |

[1] This test was made at 100° F. instead of the usual 125° F. in order to obtain some value for comparison. Tests run at 125° F. exceed 450 mm. Hg in 24 hours.

Referring to the appended drawings:

Fig. 1 shows the gas formation measured in millimeters of mercury during a 100 day test period. As shown in Fig. 1, gas formation is at a minimum even at the end of the 100 day test period. At this time, gas formation amounted to only slightly more than one pound of pressure while the average pressure considered critical in the packaging of canned paints is in the neighborhood of about eight pounds. Of remarkable significance, however, is the fact that maximum gas formation occurs during the initial 14 day period. Since after packaging the paint would normally remain under the control of the manufacturer, it is possible to release gas pressure before the paint is in the market.

It is, accordingly, feasible by virtue of the present invention to provide packaged zinc dust paint with virtually unlimited shelf life capacity.

Figure 2:
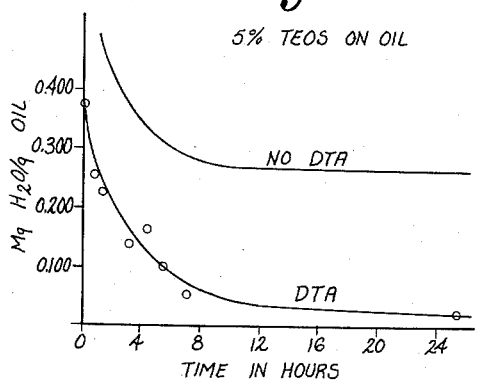
Figure 3:
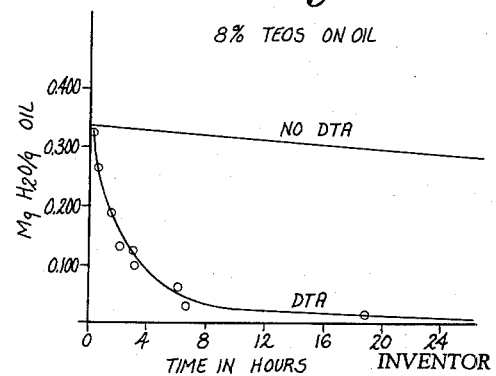

Figs. 2 and 3 show the rate of water reaction in oils containing 5 and 8 percent tetraethyl orthosilicate, respectively. In these experiments using the Karl Fischer reagent, the rate of water reaction with the silicate in the vehicle was measured in oils containing approximately 5 and 8 percent tetraethyl orthosilicate based on the oil. As shown in these figures, the addition of diethylene triamine has a remarkable effect on the reaction rate of the tetraethyl orthosilicate with the moisture content of the oil.

The above experiments demonstrate the effectiveness of tetraethyl orthosilicate as a gas inhibitor for drying oil type paints both in the presence and absence of a neutralizing reagent. As basic formulations for linseed oil, alkyd resin and phenolic resin paints, mixtures of Federal Specification TT-P-641b primer, paint, zinc dust-zinc oxide for galvanized surfaces have been used. Federal specifications require that all three types of paint be packaged in two compartment cans separating the zinc dust from the paint base. Some paint manufacturers have produced oil and alkyd zinc dust paint formulations as one packaged item, but there is no case known where phenolic type zinc dust-zinc oxide paints are packaged ready for use.

STABILIZATION OF PHENOLIC RESIN ZINC PAINTS

A phenolic resin zinc dust paint is prepared from a phenolic resin vehicle consisting of the reaction product of a phenol formaldehyde resin with selected drying oils. A paraphenylphenol formaldehyde resin is cooked with equal parts of tung and linseed oils in the ratio of 100 pounds of resin to 25 gallons of vegetable oil. The viscosity of the product is controlled by the addition of solvents so that the resin varnish resulting contained about 60 percent solids. The acid number of the phenolic varnish is determined by well-known titration procedures. A zinc dust phenolic resin paint can be then formulated having the following composition:

- 51.2% zinc dust
- 12.8% zinc oxide
- 18.1% phenolic varnish vehicle
- 17.9% thinners and driers Gas tests performed on this paint formulation consisted in the addition of varying quantities of tetraethyl orthosilicate with diethylene triamine to the phenolic paint with a resulting decrease in gassing tendency.

The use of the accepted standard amount of usual calcium oxide transformed the phenolic paint into a gel which was incapable of testing.

STABILIZATION OF ALKYD RESIN ZINC DUST PAINTS

The stabilizing action of tetraethyl orthosilicate on alkyd resin zinc dust paints was determined by preparing a base formulation having approximately the following composition:

| | Percent |
|---|---|
| Zinc dust | 49.63 |
| Zinc oxide | 12.41 |
| Alkyd resin | 16.33 |
| Thinners and driers | 21.63 |

The alkyd resin vehicle used in the formulation was a Beckosol P–381–70 consisting of a solution of alkyd resin in organic solvents to the amount of 70 percent solids. In preparing the paint, a base is prepared by grinding approximately 90 grams of zinc oxide extender with 30 grams of the alkyd resin solution in the presence of 1.5 grams of tetraethyl orthosilicate, 0.15 cc. diethylene triamine and 28.5 grams of mineral spirits. The balance of the paint ingredients are thoroughly mixed with the base formulation to form the alkyd resin paint. The modified alkyd resin paint is then subjected to gassing experiments, the results of which are set forth in the following tables:

CAN TESTS ON ZINC DUST/ZINC OXIDE AYLKD PAINT

Test Conditions: 7 days at 125° F.
Additive: Tetraethyl orthosilicate added to finished paint. No diethylene triamine used.

| Amount of Additive on Wt. Basis of Paint | Pressure in p.s.i. |
|---|---|
| 1.5% | 1 |
| 1.75% | ¼ |
| 2.00% | 0 |
| 2.25% | 0 |
| 2.50% | 0 |

Table IV

STRAIGHT TUBE MANOMETER TESTS ON ZINC DUST/ZINC OXIDE ALKYD PAINT

Test Temperature: 125° F.
Additive: Tetraethyl orthosilicate added on basis of alkyd resin solution and diethylene triamine added on basis of acid numbers of alkyd resin solid.

| Amount of Additive | Time (days) | Pressure (mm. Hg) | Remarks |
|---|---|---|---|
| 0.5% CaO on dust | 4 | 189, 170 | Control Paint. |
| Do | 3 | 215, 263 | Commercial paint grade zinc dust. |
| 1.2% TEOS | 4 | 197, 234 | |
| 3.0% TEOS | 63 | 94, 154 | |
| 5.0% TEOS | 63 | 76, 111 | |
| 5.0% TEOS (no DTA) | 52 | 134, 194 | |

These experiments clearly illustrate the antigassing properties of tetraethyl orthosilicate on alkyd resin type zinc dust paints. In all cases, irrespective of the paint vehicle, the tetraethyl orthosilicate functions actively to immobilize the gassing tendency of aqueous components of the paint mixture in the presence of zinc and zinc oxide without objectionable side effects on the other paint components, which have characterized the prior art ingredients. The use of calcium oxide must be limited to small quantities since larger amounts alter the performance characteristics of the paint producing porous and bleached out surface films. Tetraethyl orthosilicate may be used in relatively large amounts without deleteriously affecting the paint. While drying, the material is substantially evaporated.

It will be appreciated that the claimed ingredient functions effectively to reduce gassing tendencies in zinc type paints, irrespective of the characteristics of the paint vehicle and other ingredients commonly employed in such paint formulations. Various changes and alterations may be made in such formulations without departing from the scope of the invention as defined by the appended claims.

What I claim is:

1. A paint composition comprising zinc dust, a vehicle selected from the class consisting of vegetable drying oil paints, phenolic resin paints and alkyd resin paints, tetraethyl orthosilicate in an amount of from about 1.25 to 8.0 percent based on the vehicle and a neutralizer in an amount of substantially reduce the acid number of the vehicle.

2. A paint composition as set forth in claim 1, wherein the vehicle is a vegetable drying oil paint.

3. A paint composition as set forth in claim 1 in which the vehicle is a phenolic resin paint.

4. A paint composition as set forth in claim 1 in which the vehicle is an alkyd resin paint.

5. A paint composition as set forth in claim 1 in which the neutralizer is present in an amount to reduce the acid number of the vehicle to just above neutrality.

6. A paint composition comprising zinc dust, a vegetable drying oil vehicle, tetraethyl orthosilicate in an amount of from about 1.25 to 8.0 percent based on the vehicle and a neutralizer in an amount to reduce the acid number of the vehicle to just above neutrality.

7. A paint composition as set forth in claim 6 in which the tetraethyl orthosilicate is present in an amount of from about 4 to 6 percent based on the vehicle.

8. A paint composition as set forth in claim 6, wherein the tetraethyl orthosilicate is present in an amount of about 5 percent based on the vehicle.

9. A paint composition comprising zinc dust, a vegetable drying oil vehicle, tetraethyl orthosilicate in an amount of from about 1.25 to 8.0 percent based on the vehicle and diethylene triamine in an amount to reduce the acid number of the vehicle to just above neutrality.

10. A paint composition comprising zinc dust, a vehicle selected from the class consisting of vegetable drying oil paints, phenolic resin paints and alkyd resin paints, tetraethyl orthosilicate in an amount of from about 4 to 6 percent based on the vehicle and diethylene triamine in an amount to reduce the acid number of the vehicle to just above neutrality.

References Cited in the file of this patent

UNITED STATES PATENTS

| | | |
|---|---|---|
| 1,927,117 | Friedrich | Sept. 19, 1933 |
| 2,044,292 | Grady | June 16, 1936 |
| 2,450,327 | Cogan | Sept. 28, 1948 |
| 2,524,357 | Robey | Oct. 3, 1950 |
| 2,540,108 | Fisher | Feb. 6, 1951 |
| 2,585,609 | Wills | Feb. 12, 1952 |
| 2,870,035 | Allen | Jan. 20, 1959 |
| 2,882,177 | Newton | Apr. 14, 1959 |
| 2,913,419 | Alexander | Nov. 17, 1959 |

UNITED STATES PATENT OFFICE
CERTIFICATION OF CORRECTION

Patent No. 2,968,571                   January 17, 1961

Willard J. Lantz

It is hereby certified that error appears in the above numbered patent requiring correction and that the said Letters Patent should read as corrected below.

Column 5, line 22, before "CAN TESTS ON ZINC DUST/ZINC OXIDE AYLKD PAINT" insert the heading -- Table III --; column 6, line 16, for "amount of" read -- amount to --.

Signed and sealed this 6th day of June 1961.

(SEAL)
Attest:

ERNEST W. SWIDER                   DAVID L. LADD
Attesting Officer                       Commissioner of Patents